United States Patent [19]
Hirata et al.

[11] Patent Number: 6,166,112
[45] Date of Patent: *Dec. 26, 2000

[54] CEMENT ADMIXTURE AND CEMENT COMPOSITION

[75] Inventors: Tsuyoshi Hirata, Kobe; Tsutomu Yuasa, Osaka; Koichiro Nagare, Suita, all of Japan

[73] Assignee: Nippon Shokubai Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/082,835

[22] Filed: May 21, 1998

[30] Foreign Application Priority Data

Mar. 10, 1997 [JP] Japan ................................. 9-151945

[51] Int. Cl.$^7$ ......................................... C08K 3/00
[52] U.S. Cl. ......................................... 524/5; 526/318.41
[58] Field of Search ............................ 524/5; 526/318.41

[56] References Cited

U.S. PATENT DOCUMENTS

| | | | |
|---|---|---|---|
| 4,138,381 | 2/1979 | Chang | 526/318.41 |
| 4,268,641 | 5/1981 | Koenig | 526/318.41 |
| 4,351,754 | 9/1982 | Dupre | 526/318.41 |
| 4,421,902 | 12/1983 | Chang | 526/318.41 |
| 4,429,097 | 1/1984 | Chang | 526/318.41 |
| 5,334,683 | 8/1994 | Kawanaka | 526/318.41 |
| 5,614,017 | 3/1997 | Shawl | 524/5 |
| 5,663,263 | 9/1997 | Fischer | 526/318.41 |
| 5,874,495 | 2/1999 | Robinson | 524/300 |

FOREIGN PATENT DOCUMENTS

| | | |
|---|---|---|
| 0 056 627 A2 | 7/1982 | European Pat. Off. . |
| 0 291 590 A1 | 11/1988 | European Pat. Off. . |
| 0 308 915 A2 | 3/1989 | European Pat. Off. . |
| 0 331 308 A2 | 9/1989 | European Pat. Off. . |
| 0 490 681 A1 | 6/1992 | European Pat. Off. . |
| 0 549 280 A1 | 6/1993 | European Pat. Off. . |
| 0 612 702 A1 | 8/1994 | European Pat. Off. . |
| 0 753 488 A2 | 1/1997 | European Pat. Off. . |
| 58-74552 | 5/1983 | Japan . |
| 58-38380 | 8/1983 | Japan . |
| 59-18338 | 4/1984 | Japan . |
| 59-162161 | 9/1984 | Japan . |
| 62-106053 | 5/1987 | Japan . |
| 62-119147 | 5/1987 | Japan . |
| 62-216950 | 9/1987 | Japan . |
| 1-113419 | 5/1989 | Japan . |
| 1-226757 | 9/1989 | Japan . |
| 4-149056 | 5/1992 | Japan . |
| 5-43288 | 2/1993 | Japan . |
| 5-32384 | 5/1993 | Japan . |
| 5-36377 | 5/1993 | Japan . |
| 5-170501 | 7/1993 | Japan . |
| 5-213644 | 8/1993 | Japan . |
| 6-191918 | 7/1994 | Japan . |
| 7-247150 | 9/1995 | Japan . |
| 7-267705 | 10/1995 | Japan . |
| 2 280 180 | 1/1995 | United Kingdom . |
| WO 95/16643 A1 | 6/1995 | WIPO . |

Primary Examiner—Paul R. Michl

[57] ABSTRACT

The invention provides: a cement admixture which has excellent cement dispersibility and can afford high slump retainability; and a cement composition which has excellent cement dispersibility and high slump retainability. The cement admixture comprises a polycarboxylic acid as an effective component, wherein the polycarboxylic acid is obtained by a process including the steps of: charging "a" parts by weight of a polyalkylene glycol (A) and "b" parts by weight of a (meth)acrylic acid monomer (B) into a reactor in the range of $\{(a/n^{1/2})/b\} \times 100 \leq 200$, wherein n is an average molar number of the added oxyalkylene groups in the polyalkylene glycol (A) and is a number of 1 to 300; carrying out an esterification reaction of the resultant mixture in the reactor, thus obtaining a polyalkylene glycol (meth)acrylate (C); and copolymerizing the resultant polyalkylene glycol (meth)acrylate (C) and the (meth)acrylic acid monomer (B), thus obtaining the polycarboxylic acid.

23 Claims, No Drawings

CEMENT ADMIXTURE AND CEMENT COMPOSITION

BACKGROUND OF THE INVENTION

A. Technical Field

The present invention relates to a cement admixture and a cement composition containing this admixture.

B. Background Art

The recent concrete industry greatly requires concrete buildings to be enhanced in durability and strength, and it is known that the durability and the strength of the concrete buildings are both improved by enhancing the dispersibility of cement in a cement composition as used for producing the concrete buildings.

In the concrete industry, a time is spent from the preparation of a cement composition till the use thereof. Therefore, a high slump retainability is also demanded to the cement composition.

SUMMARY OF THE INVENTION

A. Objects of the Invention

An object of the present invention is to provide: a cement admixture which has excellent cement dispersibility and can afford high slump retainability; and a cement composition which has excellent cement dispersibility and high slump retainability.

B. Disclosure of the Invention

The present inventors diligently studied to solve the above-mentioned problems, and as a result, completed the present invention by finding that a polycarboxylic acid is excellent in cement dispersibility and slump retainability, wherein the polycarboxylic acid is obtained by copolymerizing a polyalkylene glycol (meth)acrylate with (meth)acrylic acid, wherein the polyalkylene glycol (meth)acrylate is obtained by carrying out an esterification reaction of a polyalkylene glycol and (meth)acrylic acid in a specific ratio therebetween and under specific conditions.

Thus, a cement admixture, according to the present invention, comprises a polycarboxylic acid as an effective component, wherein the polycarboxylic acid is obtained by a process including the steps of:

charging "a" parts by weight of a polyalkylene glycol (A) of the general formula (1) below and "b" parts by weight of a (meth)acrylic acid monomer (B) of the general formula (2) below into a reactor in the range of the equation (1) below;

carrying out an esterification reaction of the resultant mixture in the reactor, thus obtaining a polyalkylene glycol (meth)acrylate (C) of the general formula (3) below; and copolymerizing the resultant polyalkylene glycol (meth)acrylate (C) and the (meth)acrylic acid monomer (B), thus obtaining the polycarboxylic acid;

wherein the general formula (1) is:

$$HO(R^1O)_nR^2 \quad (1)$$

wherein the general formula (2) is:

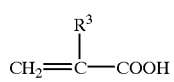

(2)

wherein the equation (1) is:

$$\{(a/n^{1/2})/b\} \times 100 \leq 200 \quad (1)$$

wherein the general formula (3) is:

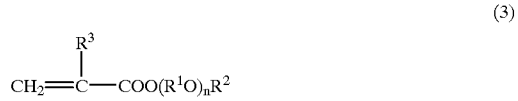

(3)

wherein: $R^1O$ is one kind of oxyalkylene group or a mixture of two or more kinds thereof, wherein the two or more kinds of oxyalkylene groups may be added either in block form or at random; $R^2$ is an alkyl group with 1 to 22 carbon atoms, a phenyl group, or an alkylphenyl group; n is an average molar number of the added oxyalkylene groups and is a number of 1 to 300; and $R^3$ is a hydrogen atom or a methyl group.

It is preferable that the polycarboxylic acid comprises: a backbone polymer with a structural unit as derived from either or both of the (meth)acrylic acid monomer (B) and a salt thereof; and a side chain which is a structural moiety as derived from the polyalkylene glycol (A); wherein the backbone polymer and the side chain are bonded to each other through either or both of an ester bond and an ether bond.

It is preferable that the part by weight "a" of the polyalkylene glycol (A), the part by weight "b" of the (meth)acrylic acid monomer (B), and the average molar number "n" of the added oxyalkylene groups meet the following equation (2):

$$40 \leq \{(a/n^{1/2})/b\} \times 100 \leq 200 \quad (2).$$

The process for obtaining the polycarboxylic acid may further include the step of adding a copolymerizable monomer to a reaction system which is subjected to the copolymerization step.

It is preferable that a reaction system which is subjected to the copolymerization step in the process for obtaining the polycarboxylic acid merely includes a polyalkylene glycol di(meth)acrylate (E) of the general formula (4) below as an impurity in a ratio of 0 to 5% by weight, more preferably, less than 1% by weight, of the polyalkylene glycol (meth)acrylate (C), wherein the general formula (4) is:

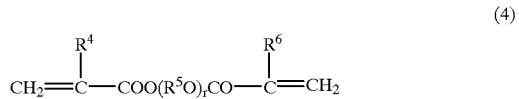

(4)

wherein: each of $R^4$ and $R^6$ is independently a hydrogen atom or a methyl group; $R^5O$ is one kind of oxyalkylene group or a mixture of two or more kinds thereof, wherein the two or more kinds of oxyalkylene groups may be added either in block form or at random; and r is an average molar number of the added oxyalkylene groups and is a number of 1 to 300.

A cement composition, according to the present invention, comprises cement, the foregoing cement admixture according to the present invention, and water as essential components.

A process for producing a polycarboxylic acid, according to the present invention, comprises the steps of:

charging "a" parts by weight of a polyalkylene glycol (A) of the general formula (1) below and "b" parts by weight of a (meth)acrylic acid monomer (B) of the general formula (2) below into a reactor in the range of the equation (1) below, wherein the polyalkylene glycol (A) has a peroxide value of 0.7 meq/kg or less;

carrying out an esterification reaction of the resultant mixture in the reactor, thus obtaining a polyalkylene glycol (meth)acrylate (C) of the general formula (3) below; and copolymerizing the resultant polyalkylene glycol (meth)acrylate (C) and the (meth)acrylic acid monomer (B), thus obtaining the polycarboxylic acid;

wherein the general formula (1) is:

$$HO(R^1O)_n R^2 \tag{1}$$

wherein the general formula (2) is:

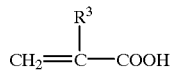
(2)

wherein the equation (1) is:

$$\{(a/n^{1/2})/b\} \times 100 \leq 200 \tag{1}$$

wherein the general formula (3) is:

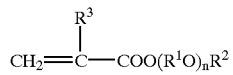
(3)

wherein: $R^1O$ is one kind of oxyalkylene group or a mixture of two or more kinds thereof, wherein the two or more kinds of oxyalkylene groups may be added either in block form or at random; $R^2$ is an alkyl group with 1 to 22 carbon atoms, a phenyl group, or an alkylphenyl group; n is an average molar number of the added oxyalkylene groups and is a number of 1 to 300; and $R^3$ is a hydrogen atom or a methyl group.

These and other objects and the advantages of the present invention will be more fully apparent from the following detailed disclosure.

DETAILED DESCRIPTION OF THE INVENTION

The cement admixture, according to the present invention, comprises a polycarboxylic acid, as obtained by the below-mentioned specific production process, as an effective component. Hereinafter, the production process for the polycarboxylic acid is first explained, and then explanations are made about the cement admixture and the cement composition containing this cement admixture.

[Production process for polycarboxylic acid]

The production process for the polycarboxylic acid as used for the cement admixture of the present invention includes the below-mentioned esterification and copolymerization steps.

Esterification Step:

In the esterification step, an esterification reaction of the polyalkylene glycol (A) and the (meth)acrylic acid monomer (B) is carried out, thus obtaining the polyalkylene glycol (meth)acrylate (C).

The polyalkylene glycol (A) is shown by the aforementioned general formula (1).

Examples of the polyalkylene glycol (A) include methoxy(poly)ethylene glycol, methoxy(poly)ethylene glycol (poly)propylene glycol, meth oxy(poly)propylene glycol, methoxy(poly)ethylene glycol (poly)butylene glycol, methoxy(poly)ethylene glycol (poly)propylene glycol (poly)butylene glycol, methoxy(poly)butylene glycol, ethoxy(poly)ethylene glycol, ethoxy(poly)ethylene glycol (poly)propylene glycol, ethoxy(poly)propylene glycol, ethoxy(poly)ethylene glycol (poly)butylene glycol, ethoxy(poly)ethylene glycol polypropylene glycol (poly)butylene glycol, ethoxy(poly)butylene glycol, phenoxy(poly)ethylene glycol, phenoxy(poly)ethylene glycol (poly)propylene glycol, phenoxy(poly)propylene glycol, phenoxy(poly)ethylene glycol (poly)butylene glycol, phenoxy(poly)ethylene glycol (poly)propylene glycol (poly)butylene glycol, phenoxy(poly)butylene glycol, alkylphenoxy(poly)ethylene glycol, alkylphenoxy(poly)ethylene glycol (poly)propylene glycol, alkylphenoxy(poly)propylene glycol, alkylphenoxy(poly)ethylene glycol (poly)butylene glycol, alkylphenoxy(poly)ethylene glycol (poly)propylene glycol (poly)butylene glycol, alkylphenoxy(poly)butylene glycol. These may be used either alone or in combinations of two or more thereof. Among them, particularly preferred ones contain a plurality of ethylene glycol chains, like methoxy(poly)ethylene glycol.

The average molar number of the added oxyalkylene groups is in the range of 1 to 300, preferably, 10 to 250, more preferably, 20 to 200.

Where $R^1$ is an alkyl group, the number of carbon atoms therein is in the range of 1 to 22, preferably, 1 to 10, more preferably, 1 to 5.

The polyalkylene glycol (A), as used in the production process for the polycarboxylic acid, preferably has a peroxide value of 0.7 meq/kg or less, more preferably, 0.5 meq/kg or less, still more preferably, 0.3 meq/kg or less. In the case where the peroxide value is more than 0.7 meq/kg, a gel is formed in the esterification step, so a removal step by filtration is needed, or abnormal molecular weight distribution, gel formation, or gelation is brought about in the copolymerization step, and as a result, the cement dispersibility or the slump retainability of the resultant polycarboxylic add is greatly deteriorated.

The (meth)acrylic acid monomer (B) is shown by the aforementioned general formula (2). Examples of such a monomer include acrylic acid, methacrylic acid, and their monovalent metal salts, divalent metal salts, organic amine salts, and ammonium salts. These may be used either alone or in combinations of two or more thereof.

In the esterification step, the part by weight "a" of the polyalkylene glycol (A), the part by weight "b" of the (meth)acrylic acid monomer (B), as charged into the reactor, and the average molar number "n" of the added oxyalkylene groups, as included in the polyalkylene glycol (A), have a relation of $\{(a/n^{1/2})/b\} \times 100 \leq 200$, wherein $\{(a/n^{1/2})/b\} \times 100$ (which might hereinafter be referred to as "K value") is a criterion for the number of the polyalkylene glycols (A) per weight of the carboxylic acid, and is preferably in the range of $40 \leq K$ value $\leq 200$, more preferably, $42 \leq K$ value $\leq 190$, still more preferably, $45 \leq K$ value $\leq 160$.

In addition, also in view of shortening the esterification reaction period of time, it is preferable to charge the polyalkylene glycol (A) and the (meth)acrylic acid monomer (B) in the above-mentioned range of the K value, and thus the productivity is greatly improved. It is unfavorable that a K value more than 200 greatly lengthens the esterification reaction period of time and therefore greatly deteriorates the productivity.

In addition, in view of performances, the conversion of the polyalkylene glycol (A) in the above-mentioned esterification reaction does not need to be 100%, but is preferably not less than 90%, more preferably, not less than 95%, still more preferably, not less than 98%.

The esterification reaction is not especially limited, but can be carried out by conventional methods using conventional catalysts and polymerization inhibitors, and further, if necessary, conventional solvents.

As to the catalysts as used for the esterification reaction, conventional ones can widely be used. Examples of such catalysts include sulfuric acid, paratoluenesulfonic acid, and methanesulfonic acid. These may be used either alone or in combinations of two or more thereof.

Also as to the polymerization inhibitors as used for the esterification reaction, conventional ones can widely be used. Examples of such polymerization inhibitors include: quinones such as hydroquinone and methoquinone; cupferron; and phenothiazine. These may be used either alone or in combinations of two or more thereof.

The esterification reaction can be carried out under reduced pressure or normal pressure and in the presence or absence of a solvent. In view of distilling off water, as formed in the esterification reaction, out of the reactor, it is preferable to use a solvent azeotropic with water, and when the esterification reaction is carried out in the absence of any solvent, the formed water can be eliminated by passing inert gases such as nitrogen and helium through the reactor. Examples of such a solvent include: aromatic ones such as benzene, toluene, and xylene; alicyclic compounds such as cyclohexane; and aliphatic hydrocarbons such as n-hexane. These may be used either alone or in combinations of two or more thereof.

The polyalkylene glycol (meth)acrylate (C) as obtained in the above-mentioned way has a structure of the foregoing general formula (3).

Copolymerization Step:

In the copolymerization step, the polyalkylene glycol (meth)acrylate (C), resultant from the foregoing esterification step, and the (meth)acrylic acid monomer (B) are copolymerized, thus obtaining the polycarboxylic acid. The copolymerization step permits the below-mentioned copolymerizable monomer (D) to be added to a reaction system, which is then subjected to the copolymerization, and thus the copolymerization step uses a monomer mixture (I) which comprises the polyalkylene glycol (meth)acrylate (C) and the (meth)acrylic acid monomer (B) as essential components and may further comprise the below-mentioned copolymerizable monomer (D).

The reaction mixture including the polyalkylene glycol (meth)acrylate (C), as obtained in the above-mentioned esterification step, further includes the (meth)acrylic acid monomer (B), so this reaction mixture can, as is, be used as the monomer mixture (I) in the copolymerization step. If the reaction mixture is used in such a way, the productivity of the objective polycarboxylic acid is greatly improved. In addition, in the case where the esterification step is carried out in the presence of a solvent, it is permitted that this solvent is distilled off after the esterification step, and the resultant monomer mixture (I) is then converted into an aqueous solution, which is then used in the copolymerization step.

A product as obtained by further adding a copolymerizable monomer to the above-mentioned reaction mixture can be used as the monomer mixture (I). As to the copolymerizable monomer, either or both of the (meth)acrylic acid monomer (B) and another copolymerizable monomer (D) can be exemplified. Particularly, it is preferable to add the (meth)acrylic acid monomer (B).

Examples of the copolymerizable monomer (D) include: unsaturated dicarboxylic acids, such as maleic acid, fumaric acid, itaconic acid, and citraconic acid, and their monovalent metal salts, divalent metal salts, ammonium salts, and organic amine salts, or anhydrides; half esters and diesters as formed from the above-mentioned unsaturated dicarboxylic acids and alcohols with 1 to 22 carbon atoms; half amides and diamides as formed from the above-mentioned unsaturated dicarboxylic acids and amines with 1 to 22 carbon atoms; half esters and diesters as formed from the above-mentioned unsaturated dicarboxylic acids and alkyl polyalkylene glycols as obtained by adding 1 to 300 mols of oxyalltylenes with 2 to 4 carbon atoms to the above-mentioned alcohols or amines; half esters and diesters as formed from the above-mentioned unsaturated dicarboxylic adds and glycols with 2 to 4 carbon atoms or polyalkylene glycols of 2 to 300 in molar number of the addition of the foregoing glycols; half amides as formed from maleamic acid and glycols with 2 to 4 carbon atoms or polyalkylene glycols of 2 to 300 in molar number of the addition of the foregoing glycols; (poly)alkylene glycol di(meth)acrylates (which might hereinafter be referred to as "polyalkylene glycol di(meth)acrylate(s) (E)) such as triethylene glycol di(meth)acrylate, (poly)ethylene glycol di(meth)acrylate, polypropylene glycol di(meth)acrylate, and (poly)ethylene glycol (poly)propylene glycol di(meth)acrylate; difunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate; unsaturated sulfonic acids, such as vinylsulfonate, (meth)allylsulfonate, 2-(meth)acryloxyethylsulfonate, 3-(meth)acryloxypropylsulfonate, 3-(meth)acryloxy-2-hydroxypropylsulfon ate, 3-(meth)acryloxy-2-hydroxypropylsulfophenyl ether, 3-(meth)acryloxy-2-hydroxypropyloxysulfobenzoate, 4-(meth)acryloxybutylsulfon ate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; esters, as formed from (meth)acrylic add and alcohols with 1 to 22 carbon atoms, such as methyl (meth)acrylate, ethyl (meth)acrylate, propyl (meth)acrylate, butyl (meth)acrylate, 2-ethylhexyl (meth)acrylate, 2-hydroxyethyl (meth)acrylate, hydroxypropyl (meth)acrylate, hydroxybutyl (meth)acrylate, methyl crotonate, and glycidyl (meth)acrylate; amides, as formed from unsaturated monocarboxylic acids and amines with 1 to 22 carbon atoms, such as methyl (meth)acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono (meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acrylamide, (meth)acrylalkylamide, N-methylol (meth)acrylamide, and N,N-dimethyl(meth)acrylamide; unsaturated cyanes such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth) allyl ether; unsaturated amino compounds such as dimethylaminoethyl (meth)acrylate; vinyl ethers or allyl ethers, such as methoxypolyethylene glycol monovinyl ether, polyethylene glycol monovinyl ether, methoxypolyethylene glycol mono(meth)allyl ether, and polyethylene glycol mono(meth) allyl ether; and siloxane derivatives such as polydimethylsiloxanepropylaminomaleamic acid, polydim ethylsiloxaneamin opropyleneaminomaleamic acid, polydimethylsiloxanebis(propylaminomaleamic acid), polydimethylsiloxanebis(dipropyleneaminomaleamic acid), polydimethylsiloxane-(1-propyl-3-acrylate), polydimethylsiloxane-(1-propyl-3-methacrylate), polydimethylsiloxanebis(1-propyl-3-acrylate), and polydimethylsiloxanebis(1-propyl-3-methacrylate). These may be used either alone or in combinations of two or more thereof.

In addition, the monomer mixture (I) may include the polyalkylene glycol di(meth)acrylate (E) of the above-mentioned general formula (4) as an impurity as included in the reaction system which is subjected to the preceding copolymerization, but the content of the polyalkylene glycol di(meth)acrylate (E) is preferably in the range of 0 to 5% by weight, more preferably, less than 1% by weight, still more preferably, less than 0.1% by weight, most preferably, 0% by weight, relative to the polyalkylene glycol (meth)acrylate (C). In the case where the polyalkylene glycol di(meth) acrylate is more than 5% by weight, abnormal molecular weight distribution and abnormal conversion into a high molecular weight occur during the polymerization, and as a result, the cement dispersibility or the slump retainability of the resultant polycarboxylic acid is greatly deteriorated.

The method for polymerizing the monomer mixture (I) is not especially limited, and conventional polymerization methods such as solution or bulk polymerization using polymerization initiators can be employed.

The polymerization method can be carried out either in a batch manner or continuous manner, and solvents as are, if necessary, used therein are available from among conventional ones and are not especially limited. Examples of such solvents include: alcohols such as methyl alcohol, ethyl alcohol, and isopropyl alcohol; aromatic or aliphatic hydrocarbons such as benzene, toluene, xylene, cyclohexane, and n-heptane; esters such as ethyl acetate; ketones such as acetone and methyl ethyl ketone. If the respective solubility of the monomer mixture and the resultant polycarboxylic acid is, however, considered, it is preferable to use at least one solvent selected from the group consisting of water and lower alcohols with 1 to 4 carbon atoms.

The polymerization initiator is available from among conventional ones and is not especially limited. Examples of such a polymerization initiator include: persulfates such as ammonium persulfate, sodium persulfate, and potassium persulfate; hydrogen peroxide; azo compounds such as azobis(2-methylpropionamidine) hydrochloride and azobisisobutyronitrile; peroxides such as benzoyl peroxide, lauroyl peroxide, and cumene hydroperoxide. These may be used either alone or in combinations of two or more thereof. The polymerization initiator may be used jointly with at least one promotor selected from among: reductants such as sodium hydrogen sulfite, sodium sulfite, Mohr's salt, sodium pyrobisulfite, sodium formaldehydesulfoxylate, and ascorbic acid; and amine compounds such as ethylenediamine, sodium ethylenediaminetetraacetate, and glycine.

Chain transfer agents can also be used, if necessary. The chain transfer agents are available from among conventional ones and are not especially limited, but examples thereof include mercaptopropionic acid, 2-ethylhexyl mercaptopropionate, 2-mercaptoethyl octanate, 1,8-dimercapto-3,6-dioxaoctane, decanetrithiol, dodecylmercaptan, hexadecanethiol, decanethiol, carbon tetrachloride, carbon tetrabromide, α-methylstyrene dimer, terpinolene, α-terpinene, γ-terpinene, dipentene, and 2-aminopropan-1-ol. These may be used either alone or in combinations of two or more thereof.

The polymerization temperature is fitly determined dependently upon the polymerization method, the solvent, the polymerization initiator, and the chain transfer agent as used, but the polymerization is usually carried out in the range of 0 to 150° C.

The polycarboxylic acid as obtained by the above-mentioned production process has excellent cement dispersibility and high slump retainability and therefore can, even as is, be used as a main component of the cement admixture of the present invention, but may be used in the form as neutralized with an alkaline substance, if necessary. Preferable examples of such an alkaline substance include: inorganic salts such as hydroxides, chlorides, and carbonates of monovalent and divalent metals; ammonia; and organic amines.

The polycarboxylic acid is a polymer comprising a principal chain and a side chain, wherein the principal chain is a structural moiety as derived from either or both of the (meth)acrylic acid monomer (B) and a salt thereof, and the side chain is a structural moiety as derived from the preceding polyalkylene glycol (A), and further the principal chain and the side chain are bonded to each other through either or both of an ester bond and an ether bond.

The molecular weight of the polycarboxylic acid is permitted to be in a wide range, but it is , for example, in the range of 500 to 1,000,000, preferably, in the range of 5,000 to 500,000, more preferably, in the range of 10,000 to 100,000, still more preferably, in the range of 15,000 to 50,000.

[Cement admixture]

The cement admixture of the present invention comprises the polycarboxylic acid, as obtained by the above-mentioned production process, as an effective component.

The present invention cement admixture may further comprise conventional cement admixture components in addition to the above-mentioned polycarboxylic acid. Examples of such other conventional cement admixture components include cement dispersants, air-entraining agents, cement humectants, swelling materials, waterproof agents, retarders, accelerators, water-soluble high-molecular substances, thickeners, flocculants, dry-shrinkage diminishing agents, strength enhancing agents, curing promotors, and defoaming agents.

Examples of the above-mentioned cement dispersants include: ligninsulfonic acid salts; oxycarboxylic acid salts; polyol derivatives; naphthalenesulfonic acid-formalin condensation products; melaminesulfonic acid-formalin condensation products; aminosulfonic compounds, such as aminoarylsulfonic acid-phenol-formaldehyde condensation products, as disclosed in JP-A-01-113419; polycarboxylic acids (or salts thereof) such as: cement dispersants, as disclosed in JP-A-07-267705, comprising (a) copolymers and/or salts thereof, as formed from polyalkylene glycol mono(meth)acrylate compounds and (meth)acrylic compounds, (b) copolymers and/or their hydrolyzed products and/or salts, as formed from polyalkylene glycol mono (meth)allyl ether compounds and maleic anhydride, and (c) copolymers and/or salts thereof, as formed from polyalkylene glycol mono(meth)allyl ether compounds and polyalkylene glycol maleates; concrete admixtures, as disclosed in Japanese Patent No. 2508113, comprising (A) copolymers as formed from polyalkylene glycol (meth)acrylates and (meth)acrylic acid (or salts thereof), (B) specific polyethylene glycol polypropylene glycol compounds, and (C) specific surfactants; copolymers as disclosed in JP-A-62-216950 and formed from either polyethylene(propylene) glycol (meth)acrylate or polyethylene(propylene) glycol mono(meth)allyl ether, and (meth)allylsulfonic acid (or salts thereof) and (meth)acrylic acid (or salts thereof); copolymers as disclosed in JP-A-01-226757 and formed from polyethylene(propylene) glycol (meth)acrylate, (meth)allylsulfonic acid (or salts thereof), and (meth)acrylic acid (or salts thereof); copolymers as disclosed in JP-B-05-036377 and formed from polyethylene(propylene) glycol (meth)acrylate, either (meth)allylsulfonic acid (or salts thereof) or p-(meth)allyloxybenzenesulfonic acid (or salts thereof), and (meth)acrylic acid (or salts thereof); copolymers as disclosed in JP-A-04-149056 and formed from polyethylene glycol mono(meth)allyl ether and maleic acid (or salts thereof); copolymers as disclosed in JP-A-05-170501 and formed from polyethylene glycol (meth)acrylate, (meth)allylsulfonic acid (or salts thereof), (meth)acrylic acid (or salts thereof), alkanediol mono(meth)acrylate, polyalkylene glycol mono(meth)acrylate, and α,γ-unsaturated monomers with an amide group in their molecules; copolymers as disclosed in JP-A-06191918 and formed from polyethylene glycol mono(meth)allyl ether, polyethylene glycol mono(meth)acrylate, alkyl (meth)acrylates, (meth)acrylic acid (or salts thereof), and either (meth)allylsulfonic acid (or salts thereof) or p-(meth)allyloxybenzenesulfonic acid (or salts thereof); copolymers or their hydrolyzed products or salts, as disclosed in JP-A-05043288 and formed from alkoxypolyalkylene glycol monoallyl ether and maleic anhydride; copolymers or their salts or esters, as disclosed in JP-B-58-038380 and formed from polyethylene glycol monoallyl ether, maleic acid, and monomers copolymerizable with these monomers; copolymers as disclosed in JP-B-59-018338 and formed from polyalkylene glycol mono(meth)acrylate monomers, (meth)acrylic ester monomers, and monomers copolymerizable with these monomers; and copolymers or salts thereof, as disclosed in JP-A-62-119147 and formed from (meth)acrylic esters with a sulfonic acid group and, in case of need, monomers copolymerizable therewith.

The proportion of the above-mentioned polycarboxylic acid in the present invention cement admixture is not especially limited, but is preferably in the range of 10 to 100% by weight, more preferably, 50 to 100% by weight, most preferably, 80 to 100% by weight, relative to the entirety of the cement admixture. In the case where the proportion of the polycarboxylic acid is less than 10% by weight, the cement dispersibility and the slump retainability might be deteriorated.

[Cement composition]

The cement composition, according to the present invention, comprises cement, the foregoing cement admixture according to the present invention, and water as essential components, and is, for example, used as cement paste, mortar, or concrete.

The cement as used is, in general, normal portland cement, but the following other materials are also available: portland cement, such as high-early-strength types, ultra-high-early-strength types, moderate heat types, and white types, and mixed portland cement, such as alumina cement, fly ash cement, slug cement, and silica cement.

The proportion of the cement admixture in the present invention cement composition is not especially limited, but is preferably in the range of 0.01 to 10% by weight, more preferably, 0.05 to 5% by weight, of cement (in terms of solid content). In the case where the proportion of the cement admixture is smaller than 0.01% by weight, the resultant performance is insufficient. Or otherwise the proportion larger than 10% by weight is economically disadvantageous.

The ratio between cement and water in the present invention cement composition is not especially limited, but is preferably in the range of water/cement (ratio by weight)= 0.1 to 0.7, more preferably, 0.2 to 0.65.

The unit amount of water in the present invention cement composition is not especially limited, but is preferably in the range of 100 to 185 $kg/m^3$, more preferably, 120 to 175 $kg/m^3$.

The present invention cement composition can further comprise components other than cement, the cement admixture, and water. Examples of the other components include: fine aggregates; coarse aggregates; and fine powders such as fly ash, shaft furnace slug, silica fume, and limestone.

(Effects and Advantages of the Invention):

The cement admixture, according to the present invention, has excellent cement dispersibility and can afford high slump retainability.

Because the cement composition, according to the present invention, contains the above-mentioned cement admixture, this composition has excellent cement dispersibility and high slump retainability.

The process for producing a polycarboxylic acid, according to the present invention, can produce the polycarboxylic acid efficiently without involving gel formation in the esterification step.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, in the below-mentioned examples, unless otherwise noted, the units "%" and "part(s)" denote those by weight.

Hereinafter, polyalkylene glycols were first produced in Production Examples 1 to 5, and polycarboxylic acids were then produced.

Production Example 1 for Producing Polyalkylene Glycol (1)

A mixture of 32 parts of methanol and 0.23 parts of sodium hydroxide was charged into an autoclave as equipped with a thermometer and a stirrer, and the internal atmosphere of the autoclave was sufficiently replaced with nitrogen. Then, the mixture was heated to 70° C., and 132 parts of ethylene oxide was introduced into the autoclave over a period of 1 hour, and the reaction mixture was then kept at 70° C. for 1 hour to complete an ethylene oxide addition reaction, thus obtaining an alcohol as formed by addition of 3 mols of ethylene oxide to 1 mol of methanol. Subsequently, the reaction mixture was heated to 155° C., and 308 parts of ethylene oxide was introduced into the autoclave, and the reaction mixture was then kept at 155° C. for 1 hour to complete an addition reaction, thus obtaining a methoxypolyethylene glycol (n=10) as polyalkylene glycol (1), of which the peroxide value as measured by the below-mentioned method was 0.2 meq/kg.

[Measurement method for peroxide value]

A mixture of 10 g of polyalkylene glycol (1), 35 ml of chloroform, and 35 ml of acetic acid was placed into a flask, and while replacing the internal atmosphere of the flask with nitrogen, 1 ml of a saturated potassium iodide solution was added into the flask, and the resultant mixture was stirred and then left to stand stationary for 20 minutes, thus preparing a brown test solution. This test solution was titrated with 0.01-N sodium thiosulfate until the brown color of the solution disappeared, thus calculating a peroxide value in accordance with the following equation:

$$\text{peroxide value (meq/kg)} = (A-B) \times 10/S$$

wherein: A is the titration amount (ml) of the 0.01-N sodium thiosulfate as needed for the titration of the sample; B is the titration amount (ml) of the 0.01-N sodium thiosulfate as needed for a blank test; and S is the amount (g) of the sample as taken.

Production Example 2 for Producing Polyalkylene Glycol (2)

Polyalkylene glycol (2) was obtained by, under an air atmosphere, heating and thereby melting polyalkylene glycol (1) as obtained in Production Example 1 above. The peroxide value of polyalkylene glycol (2), as measured in the same way as of Production Example 1, was 0.8 meq/kg.

Production Example 3 for Producing Polyalkylene Glycol (3)

A mixture of 32 parts of methanol and 0.55 parts of sodium hydroxide was charged into an autoclave as equipped with a thermometer and a stirrer, and the internal atmosphere of the autoclave was sufficiently replaced with nitrogen. Then, the mixture was heated to 70° C., and 132 parts of ethylene oxide was introduced into the autoclave over a period of 1 hour, and the reaction mixture was then kept at 70° C. for 1 hour to complete an ethylene oxide addition reaction, thus obtaining an alcohol as formed by addition of 3 mols of ethylene oxide to 1 mol of methanol. Subsequently, the reaction mixture was heated to 155° C., and 968 parts of ethylene oxide was introduced into the autoclave, and the reaction mixture was then kept at 155° C. for 1 hour to complete an addition reaction, thus obtaining a methoxypolyethylene glycol (n=25) as polyalkylene glycol (3), of which the peroxide value as measured in the same way as of Production Example 1 was 0.2 meq/kg.

Production Example 4 for Producing Polyalkylene Glycol (4)

A mixture of 32 parts of methanol and 1.65 parts of sodium hydroxide was charged into an autoclave as equipped with a thermometer and a stirrer, and the internal atmosphere of the autoclave was sufficiently replaced with nitrogen. Then, the mixture was heated to 70° C., and 132 parts of ethylene oxide was introduced into the autoclave over a period of 1 hour, and the reaction mixture was then kept at 70° C. for 1 hour to complete an ethylene oxide addition reaction, thus obtaining an alcohol as formed by addition of 3 mols of ethylene oxide to 1 mol of methanol. Subsequently, the reaction mixture was heated to 155° C., and 3,168 parts of ethylene oxide was introduced into the autoclave, and the reaction mixture was then kept at 155° C. for 1 hour to complete an addition reaction, thus obtaining a methoxypolyethylene glycol (n=75) as polyalkylene glycol (4), of which the peroxide value as measured in the same way as of Production Example 1 was 0.2 meq/kg.

Production Example 5 for Producing Polyalklene Glycol (5)

A mixture of 32 parts of methanol and 3.3 parts of sodium hydroxide was charged into an autoclave as equipped with a thermometer and a stirrer, and the internal atmosphere of the autoclave was sufficiently replaced with nitrogen. Then, the mixture was heated to 70° C., and 132 parts of ethylene oxide was introduced into the autoclave over a period of 1 hour, and the reaction mixture was then kept at 70° C. for 1 hour to complete an ethylene oxide addition reaction, thus obtaining an alcohol as formed by addition of 3 mols of ethylene oxide to 1 mol of methanol. Subsequently, the reaction mixture was heated to 155° C., and 6,468 parts of ethylene oxide was introduced into the autoclave, and the reaction mixture was then kept at 155° C. for 1 hour to complete an addition reaction, thus obtaining a methoxypolyethylene glycol (n=150) as polyalkylene glycol (5), of which the peroxide value as measured in the same way as of Production Example 1 was 0.2 meq/kg.

EXAMPLE 1

A mixture of 1,346 parts of the methoxypolyethylene glycol (n=10) with a peroxide value of 0.2 meq/kg, as obtained in Production Example 1, and 654 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (1). The esterification conversion, as confirmed by liquid chromatography, was 99%, and no polyethylene glycol dimethacrylate was detected. The K value of the monomer mixture (1) was 65.

Next, 1,900 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 95° C. under a nitrogen atmosphere. Next, 2,000 parts of an aqueous solution, as prepared by adding 1,000 parts of water to 1,000 parts of the preceding monomer mixture (1), was dropped into the reactor over a period of 4 hours, and further 100 parts of an aqueous solution, as prepared by dissolving 10 parts of ammonium persulfate into 90 parts of water, was dropped into the reactor over a period of 5 hours. After the droppings had been completed, the reaction mixture was kept at 95° C. for further 1 hour and then neutralized with an aqueous sodium hydroxide solution, thus obtaining a polycarboxylic acid (1) with a molecular weight of 33,000.

A cement composition (1) was prepared by the below-mentioned concrete test method using the resultant polycarboxylic acid (1) itself as a cement admixture (1) to measure a slump value. Results thereof are shown in Table 1.

[Concrete test method]

A cement composition (1) was prepared in a mixing and kneading amount of 50 L using the above-obtained cement admixture (1), normal Portland cement (mixture of equivalent amounts of three brands; specific gravity=3.16) as cement, a sand blend (specific gravity=2.62, FM=2.71) of land sand from Oi River System, Japan and mountain sand from Kisarazu, Japan as a fine aggregate, and crushed pieces of hard sandstone from Oume, Japan (specific gravity=2.64, MS=20 mm) as a coarse aggregate. The amount of the cement admixture (1) as combined in the resultant cement composition (1) is shown in Table 1. The combination conditions for preparing the cement composition (1) were as follows: unit amount of cement=320 kg/m$^3$, unit amount of water=166 kg/m$^3$ (water/cement ratio=51.9%), and sand aggregate ratio=47%. The slump value (cm) of the cement composition (1) was measured by a method according to the Japanese Industrial Standard (JIS A1101 and A1128) at the following three times: immediately after, 30 minutes after, and 60 minutes after the preparation of the cement composition (1).

EXAMPLE 2

A mixture of 1,346 parts of the methoxypolyethylene glycol (n=10) with a peroxide value of 0.2 meq/kg, as obtained in Production Example 1, and 654 parts of methacrylic acid, 800 parts of benzene, 20 parts of methanesulfonic acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (2). The esterification conversion, as confirmed by liquid chromatography, was 99%, and no polyethylene glycol dimethacrylate was detected. The K value of the monomer mixture (2) was 65.

Next, 1,900 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 95° C. under a nitrogen atmosphere. Next, an aqueous solution, as prepared by adding 13 parts of a 30% aqueous sodium hydroxide solution and 1,000 parts of water to 1,000 parts of the preceding monomer mixture (2), was dropped into the reactor over a period of 4 hours, and further an aqueous solution, as prepared by dissolving 10 parts of ammonium persulfate into 90 parts of water, was dropped into the reactor over a period of 5 hours. After the droppings had been completed, the reaction mixture was kept at 95° C. for further 1 hour and then neutralized with an aqueous sodium hydroxide solution until pH increased to 7.0, thus obtaining a polycarboxylic acid (2) with a molecular weight of 39,700.

A cement composition (2) was prepared in the same way as of Example 1 using the resultant polycarboxylic acid (2) itself as a cement admixture (2) to measure a slump value. Results thereof are shown in Table 1.

EXAMPLE 3

A mixture of 1,654 parts of the methoxypolyethylene glycol (n=25) with a peroxide value of 0.2 meq/kg, as obtained in Production Example 3, and 372 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (3). The esterification conversion, as confirmed by liquid chromatography, was 99%, and no polyethylene glycol dimethacrylate was detected. The K value of the monomer mixture (3) was 89.

Next, 669 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 6.2 parts of 3-mercaptopropionic acid into 1,125 parts of the preceding monomer mixture (3), was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (3) with a molecular weight of 23,000.

A cement composition (3) was prepared in the same way as of Example 1 using the resultant polycarboxylic acid (3) itself as a cement admixture (3) to measure a slump value. Results thereof are shown in Table 1.

EXAMPLE 4

A mixture of 1,635 parts of the methoxypolyethylene glycol (n=75) with a peroxide value of 0.2 meq/kg, as obtained in Production Example 4, and 374 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (4). The esterification conversion, as confirmed by liquid chromatography, was 99%, and no polyethylene glycol dimethacrylate was detected. The K value of the monomer mixture (4) was 50.

Next, 1,130 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 167 parts of water and 3.7 parts of 3-mercaptopropionic acid into 500 parts of the preceding monomer mixture (4), was dropped into the reactor over a period of 4 hours, and further an aqueous solution, as prepared by dissolving 4.6 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (4) with a molecular weight of 35,000. The resultant polycarboxylic acid (4) itself could be used as a cement admixture (4).

EXAMPLE 5

A mixture of 1,491 parts of the methoxypolyethylene glycol (n=25) with a peroxide value of 0.2 meq/kg, as obtained in Production Example 3, and 533 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (5). The esterification conversion, as confirmed by liquid chromatography, was 99%, and no polyethylene glycol dimethacrylate was detected. The K value of the monomer mixture (5) was 56.

Next, 800 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 95° C. under a nitrogen atmosphere. Next, a solution, as prepared by adding 167 parts of water to 800 parts of the preceding monomer mixture (5), was dropped into the reactor over a period of 4 hours, and further an aqueous solution, as prepared by dissolving 6.2 parts of ammonium persulfate into 190 parts of water, was dropped into the reactor over a period of 5 hours. After the droppings had been completed, the reaction mixture was kept at 95° C. for further 1 hour and then neutralized with an aqueous sodium hydroxide solution until pH increased to 7.0, thus obtaining a polycarboxylic acid (5) with a molecular weight of 22,000.

A cement composition (5) was prepared by the below-mentioned mortar test method using the resultant polycarboxylic acid (5) itself as a cement admixture (5) to measure a flow value. Results thereof are shown in Table 2.

[Mortar test method]

A cement composition (5) was prepared by mixing 240 parts of water, containing the above-obtained cement admixture (5), with 400 parts of normal portland cement (made by Chichibu Onoda K. K.) as cement and 800 parts of standard sand from Toura, Japan using a mortar mixer. The amount of the cement admixture (5) as combined in the resultant cement composition (5) is shown in Table 2.

The resultant cement composition (5) was entirely filled into a hollow cylinder of 55 mm in diameter and 50 mm in height, and the filled cylinder was then vertically lifted to define an average value of diameters in two directions of the spread cement composition (5) as a flow value (mm), which was measured at the following three times: immediately after, 30 minutes after, and 60 minutes after the preparation of the cement composition (5).

EXAMPLE 6

A mixture of 1,573 parts of the methoxypolyethylene glycol (n=25) with a peroxide value of 0.2 meq/kg, as obtained in Production Example 3, and 452 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (6). The esterification conversion, as confirmed by liquid chromatography, was 99%, and no polyethylene glycol dimethacrylate was detected. The K value of the monomer mixture (6) was 69.7.

Next, 667 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 7.51 parts of 3-mercaptopropionic acid into 1,125 parts of the preceding monomer mixture (6), was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (6) with a molecular weight of 23,000.

A cement composition (6) was prepared in the same way as of Example 5 using the resultant polycarboxylic acid (6) itself as a cement admixture (6) to measure a flow value. Results thereof are shown in Table 2.

EXAMPLE 7

A mixture of 1,694 parts of the methoxypolyethylene glycol (n=25) with a peroxide value of 0.2 meq/kg, as obtained in Production Example 3, and 333 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (7). The esterification conversion, as confirmed by liquid chromatography, was 99%, and no polyethylene glycol dimethacrylate was detected. The K value of the monomer mixture (7) was 101.7.

Next, 670 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 5.54 parts of 3-mercaptopropionic acid into 1,125 parts of the preceding monomer mixture (7), was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (7) with a molecular weight of 25,000.

A cement composition (7) was prepared in the same way as of Example 5 using the resultant polycarboxylic acid (7) itself as a cement admixture (7) to measure a flow value. Results thereof are shown in Table 2.

EXAMPLE 8

A mixture of 1,741 parts of the methoxypolyethylene glycol (n=25) with a peroxide value of 0.2 meq/kg, as obtained in Production Example 3, and 287 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (8). The esterification conversion, as confirmed by liquid chromatography, was 99%, and no polyethylene glycol dimethacrylate was detected. The K value of the monomer mixture (8) was 121.5.

Next, 669 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 6.63 parts of 3-mercaptopropionic acid into 1,125 parts of the preceding monomer mixture (8), was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (8) with a molecular weight of 35,000.

A cement composition (8) was prepared in the same way as of Example 5 using the resultant polycarboxylic add (8) itself as a cement admixture (8) to measure a flow value. Results thereof are shown in Table 2.

EXAMPLE 9

A mixture of 1,819 parts of the methoxypolyethylene glycol (n=150) with a peroxide value of 0.2 meq/kg, as obtained in Production Example 5, and 186 parts of methacrylic acid, 800 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (9). The esterification conversion, as confirmed by liquid chromatography, was 99%, and no polyethylene glycol dimethacrylate was detected. The K value of the monomer mixture (9) was 79.8.

Next, 669 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 300 parts of water and 4.59 parts of 3-mercaptopropionic acid into 500 parts of the preceding monomer mixture (9), was dropped into the reactor over a period of 4 hours, and further an aqueous solution, as prepared by dissolving 4.6 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a polycarboxylic acid (9) with a molecular weight of 45,000.

A cement composition (9) was prepared in the same way as of Example 5 using the resultant polycarboxylic acid (9) itself as a cement admixture (9) to measure a flow value. Results thereof are shown in Table 2.

EXAMPLE 10

A mixture of 1,346 parts of the methoxypolyethylene glycol (n=10) with a peroxide value of 0.8 meq/kg, as obtained in Production Example 2, and 654 parts of methacrylic acid, 660 parts of benzene, 20 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After a while, a large amount of gel attached to a stirring wing or bar and the thermometer, so the esterification reaction was intermitted, but the resultant polyalkylene glycol methacrylate could be isolated from the reaction mixture. In addition, no polyalkylene glycol dimethacrylate was detected. If it was presumed that the reaction mixture during the esterification reaction was used as the monomer mixture, the K value thereof was 65.

Methacrylic acid was added to the isolated polyalkylene glycol methacrylate to copolymerize them in the same way as of Example 1, thus obtaining a polycarboxylic acid (10) with a molecular weight of 33,000. This polycarboxylic acid (10) had properties level with the polycarboxylic acid (1) having the same molecular weight.

EXAMPLE 11

A mixture of 1,346 parts of the methoxypolyethylene glycol (n=10) with a peroxide value of 0.2 meq/kg, as obtained in Production Example 1, and 654 parts of methacrylic acid, 660 parts of benzene, 80 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a monomer mixture (11). The esterification conversion, as confirmed by liquid chromatography, was 99 %, and the content of polyethylene glycol dimethacrylate in the monomer mixture (11) was 12%. The K value of the monomer mixture (11) was 65.

Next, 1,900 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 95° C. under a nitrogen atmosphere. Next, a solution, as prepared by adding 1,000 parts of water to 1,000 parts of the preceding monomer mixture (11), was dropped into the reactor over a period of 4 hours, and further an aqueous solution, as prepared by dissolving 13.5 parts of ammonium persulfate into 86.5 parts of water, was dropped into the reactor over a period of 5 hours. After the droppings had been completed, the reaction mixture was kept at 95° C. for further 1 hour and then neutralized with an aqueous sodium hydroxide solution until pH increased to 7.0, thus obtaining a polycarboxylic acid (11) with a molecular weight of 35,700.

A cement composition (11a) was prepared in the same way as of Example 1 using the resultant polycarboxylic acid (11) itself as a cement admixture (11) to measure a slump value. Results thereof are shown in Table 1. A cement composition (11b) was prepared in the same way as of Example 5 using the cement admixture (11) to measure a flow value. Results thereof are shown in Table 2.

COMPARATIVE EXAMPLE 1

A mixture of 1,857 parts of the methoxypolyethylene glycol (n=25) with a peroxide value of 0.2 meq/kg, as obtained in Production Example 3, and 173 parts of methacrylic acid, 660 parts of benzene, 10 parts of sulfuric acid, and 0.5 parts of hydroquinone was charged into a glass-made reactor as equipped with a thermometer, a stirrer, a formed-water separator, and a reflux condenser, and the mixture was heated while stirred, thus initiating an esterification reaction. After it was confirmed that a predetermined amount of formed water was distilled off, benzene was eliminated, and a predetermined amount of water was then added, thus obtaining a 80% aqueous solution of a comparative monomer mixture (1). The esterification conversion, as confirmed by liquid chromatography, was 98%, and the content of polyethylene glycol dimethacrylate in the comparative monomer mixture (1) was 3.5%. The K value of the comparative monomer mixture (1) was 215. In Comparative Example 1, the reaction period of time was very long, so the productivity was low.

Next, 674 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 4.8 parts of 3-mercaptopropionic acid into 1,125 parts of the preceding comparative monomer mixture (1), was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a comparative polycarboxylic acid (1) with a molecular weight of 19,700.

A comparative cement composition (1) was prepared in the same way as of Example 5 using the resultant comparative polycarboxylic acid (1) itself as a comparative cement admixture (1) to measure a flow value. Results thereof are shown in Table 2.

COMPARATIVE EXAMPLE 2

A comparative cement composition (2) was prepared in the same way as of Example 1 using a salt of a naphthalenesulfonic acid-formaldehyde condensation product (NSF) as a comparative cement admixture (2) to measure a slump value. Results thereof are shown in Table 1.

COMPARATIVE EXAMPLE 3

First, 674 parts of water was charged into a glass-made reactor as equipped with a thermometer, a stirrer, a dropping funnel, a nitrogen-introducing tube, and a reflux condenser, and the internal atmosphere of the reactor was replaced with nitrogen while stirring, and the reactor was then heated to 80° C. under a nitrogen atmosphere. Next, a solution, as prepared by dissolving 13.5 parts of methacrylic acid and 8.0 parts of 3-mercaptopropionic acid into 1,055 parts of the preceding comparative monomer mixture (1) with a K value of 215, as obtained in Comparative Example 1, was dropped into the reactor over a period of 4 hours, and further an aqueous solution, as prepared by dissolving 10 parts of ammonium persulfate into 190 parts of water, was dropped into the reactor over a period of 5 hours. After the droppings had been completed, the reaction mixture was kept at 80° C. for further 1 hour and then neutralized with an aqueous sodium hydroxide solution until pH increased to 7.0, thus obtaining a comparative polycarboxylic acid (3) with a molecular weight of 37,200.

A comparative cement composition (3) was prepared in the same way as Example 5 using the resultant comparative polycarboxylic acid (3) itself as a comparative cement admixture (3) to measure a flow value. Results thereof are shown in Table 2.

TABLE 1

| | | | Slump value (cm) | | |
| --- | --- | --- | --- | --- | --- |
| | Cement admixture | Combination amount (wt %) | Immediately after preparation | 30 minutes after preparation | 60 minutes after preparation |
| Example 1 | Polycarboxylic acid (1) | 0.14 | 18 | 13.5 | 9 |
| Example 2 | Polycarboxylic acid (2) | 0.15 | 18.5 | 14.5 | 10 |
| Example 3 | Polycarboxylic acid (3) | 0.12 | 19 | 15.5 | 13.5 |
| Example 11 | Polycarboxylic acid (11) | 0.32 | 17.5 | 13.5 | 9 |
| Comparative Example 2 | NSF | 0.5 | 18 | 10.5 | 6.5 |

TABLE 2

|  | Cement admixture | Combination amount (wt %) | Flow value (cm) | | |
|---|---|---|---|---|---|
|  |  |  | Immediately after preparation | 30 minutes after preparation | 60 minutes after preparation |
| Example 5 | Polycarboxylic acid (5) | 0.18 | 18 | 90 | 9 |
| Example 6 | Polycarboxylic acid (6) | 0.15 | 106 | 95 | 89 |
| Example 7 | Polycarboxylic acid (7) | 0.25 | 95 | 90 | 85 |
| Example 8 | Polycarboxylic acid (8) | 0.3 | 96 | 95 | 94 |
| Example 9 | Polycarboxylic acid (9) | 0.15 | 107 | 85 | 70 |
| Example 11 | Polycarboxylic acid (11) | 0.35 | 98 | 92 | 87 |
| Comparative Example 1 | Comparative polycarboxylic acid (1) | 1.0 | 58 | — | — |
| Comparative Example 3 | Comparative polycarboxylic acid (3) | 0.5 | 94 | 92 | 92 |

From Table 1, it would be understood that the cement admixtures (1) to (3) and (11), according to the present invention, could achieve a slump of 18 cm (immediately after the preparation of the cement composition), and display high dispersibility, and further, merely involve a small change of the slump value with time, in a smaller amount thereof as used than that of the comparative cement admixture (2). The cement admixture (11), according to the present invention, displays a little inferior performance when compared with the cement admixtures (1) to (3) according to the present invention, but can display performance level therewith by increasing the amount of the cement admixture (11) as combined in the cement composition.

From Table 2, it would be understood that the cement admixtures (5) to (9) and (11), according to the present invention, involve only a small change of the flow value with time, and display high slump retainability. As to the comparative cement admixture (1), the K value of the comparative monomer mixture (1) as used for the preparation thereof was more than 200, so, even if a large amount of this cement admixture was used, no dispersibility was displayed, and its change with time was even unmeasurable. As to the comparative cement admixture (3), the amount thereof as combined needs to be larger than that of the cement admixture (8) as prepared with the same ratio between the polyalkylene glycol methacrylate (C) and the methacrylic acid (B) as that in the preparation of the comparative cement admixture (3). The reason therefor is considered as follows: the K value of the comparative monomer mixture (1), as used for the preparation of the comparative cement admixture (3), is more than 200, and as a result, the comparative monomer mixture (1) has as high a polyethylene glycol dimethacrylate content as 3.5%.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement admixture, comprising a polycarboxylic acid as an effective component, wherein the polycarboxylic acid is obtained by a process including the steps of:

charging "a" parts by weight of a polyalkylene glycol (A) of the general formula (1) below and "b" parts by weight of a (meth)acrylic acid monomer (1) of the general formula (2) below into a reactor in the range of the equation (1) below;

carrying out an esterification reaction of the resultant mixture in the reactor, thus obtaining a polyalkylene glycol (meth)acrylate (C) of the general formula (3) below, wherein the esterification reaction converts not less than 90% of the polyalkylene glycol (A) of the general formula (1) below to obtain the polyalkylene glycol (meth)acrylate (C) of the general formula (3) below; and copolymerizing the resultant polyalkylene glycol (meth)acrylate (C) and the (meth)acrylic acid monomer (B), thus obtaining the polycarboxylic acid;

wherein the general formula (1) is:

$$HO(R^1O)_n R^2 \tag{1}$$

wherein the general formula (2) is:

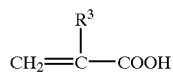
(2)

wherein the equation (1) is $$\{(a/n^{1/2})/b\} \times 100 \leq 200 \tag{1}$$

wherein the general formula (3) is:

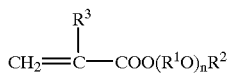
(3)

wherein $R^1O$ is one kind of oxyalkylene group or a mixture of two or more kinds thereof, wherein the two or more kinds of oxyalkylene groups may be added either in block form or at random; $R^2$ is an alkyl group with 1 to 22 carbon atoms; n is an average molar number of the added oxyalkylene groups and is a number of 1 to 300; and $R^3$ is a hydrogen atom or a methyl group.

2. A cement admixture according to claim 1, wherein the polycarboxylic acid comprises: a backbone polymer with a structural unit as derived from either or both of the (meth)acrylic acid monomer (B) and a salt thereof; and a side chain which is a structural moiety as derived from the polyalkylene glycol (A); wherein the backbone polymer and the side chain are bonded to each other through either or both of an ester bond and an ether bond.

3. A cement admixture according to claim 1, wherein the part by weight "a" of the polyalkylene glycol (A), the part by weight "b" of the (meth)acrylic acid monomer (B), and the average molar number "n" of the added oxyalkylene groups meet the following equation (2):

$$40 \leq \{(a/n^{1/2})/b\} \times 100 \leq 200 \qquad (2).$$

4. A cement admixture according to claim 1, wherein the process for obtaining the polycarboxylic acid further includes the step of adding a copolymerizable monomer to a reaction system which is subjected to the copolymerization step.

5. A cement admixture according to claim 1, wherein a reaction system which is subjected to the copolymerization step in the process for obtaining the polycarboxylic acid merely includes a polyalkylene glycol di(meth)acrylate (E) of the general formula (4) below as an impurity in a ratio of 0 to 5% by weight of the polyalkylene glycol (meth)acrylate (C), wherein the general formula (4) is:

(4)

wherein: each of $R^4$ and $R^6$ is independently a hydrogen atom or a methyl group; $R^5O$ is one kind of oxyalkylene group or a mixture of two or more kinds thereof, wherein the two or more kinds of oxyalkylene groups may be added either in block form or at random; and r is an average molar number of the added oxyalkylene groups and is a number of 1 to 300.

6. A cement composition, comprising cement, a cement admixture as recited in claim 1, and water as essential components.

7. A cement composition, comprising cement, a cement admixture as recited in any one of claims 1 to 6, and water as essential components.

8. A process for producing a polycarboxylic acid, comprising the steps of:

charging "a" parts by weight of a polyalkylene glycol (A) of the general formula (1) below and "b" parts by weight of a (meth)acrylic acid monomer (B) of the general formula (2) below into a reactor in the range of the equation (1) below; wherein the polyalkylene glycol (A) has a peroxide value of 0.7 meq/kg or less;

carrying out an esterification reaction of the resultant mixture in the reactor, thus obtaining a polyalkylene glycol (meth)acrylate (C) of the general formula (3) below, wherein the esterification reaction converts not less than 90% of the polyalkylene glycol (A) of the general formula (1) below to obtain the polyalkylene glycol (meth)acrylate (C) of the general formula (3) below, wherein the esterification reaction includes the step of charging a catalyst to the resultant mixture, with the catalyst being at least one member selected from the group consisting of sulfuric acid, paratoluenesulfonic acid. and methanesulfonic acid; and copolymerizing the resultant polyalkylene glycol (meth)acrylate (C) and the (meth)acrylic acid monomer (B), thus obtaining the polycarboxylic acid;

wherein the general formula (1) is:

$$HO(R^1O)_nR^2 \qquad (1)$$

wherein the general formula (2) is:

(2)

wherein the equation (1) is $$\{(a/n^{1/2})/b\} \times 100 \leq 200 \qquad (1)$$

wherein the general formula (3) is:

(3)

wherein $R^1O$ is one kind of oxyalkylene group or a mixture of two or more kinds thereof, wherein the two or more kinds of oxyalkylene groups may be added either in block form or at random; $R^2$ is an alkyl group with 1 to 22 carbon atoms; n is an average molar number of the added oxyalkylene groups and is a number of 1 to 300; and $R^3$ is a hydrogen atom or a methyl group.

9. A cement admixture according to claim 2, wherein the part by weight "a" of the polyalkylene glycol (A), the part by weight "b" of the (meth)acrylic acid monomer (B), and the average molar number "n" of the added oxyalkylene groups meet the following equation (2):

$$40 \leq \{(a/n^{1/2})/b\} \times 100 \leq 200 \qquad (2).$$

10. A cement admixture according to claim 2, wherein the process for obtaining the polycarboxylic acid further includes the step of adding a copolymerizable monomer to a reaction system which is subjected to the copolymerization step.

11. A cement admixture according to claim 3, wherein the process for obtaining the polycarboxylic acid further includes the step of adding a copolymerizable monomer to a reaction system which is subjected to the copolymerization step.

12. A cement admixture according to claim 2, wherein a reaction system which is subjected to the copolymerization step in the process for obtaining the polycarboxylic acid merely includes a polyalkylene glycol di(meth)acrylate (E) of the general formula (4) below as an impurity in a ratio of 0 to 5% by weight of the polyalkylene glycol (meth)acrylate (C), wherein the general formula (4) is:

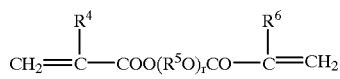

(4)

wherein: each of $R^4$ and $R^6$ is independently a hydrogen atom or a methyl group; $R^5O$ is one kind of oxyalkylene group or a mixture of two or more kinds thereof, wherein the two or more kinds of oxyalkylene groups may be added either in block form or at random; and r is an average molar number of the added oxyalkylene groups and is a number of 1 to 300.

13. A cement admixture according to claim 3, wherein a reaction system which is subjected to the copolymerization step in the process for obtaining the polycarboxylic acid merely includes a polyalkylene glycol di(meth)acrylate (E) of the general formula (4) below as an impurity in a ratio of 0 to 5% by weight of the polyalkylene glycol (meth)acrylate (C), wherein the general formula (4) is:

(4)

wherein: each of $R^4$ and $R^6$ is independently a hydrogen atom or a methyl group; $R^5O$ is one kind of oxyalkylene group or a mixture of two or more kinds thereof, wherein the two or more kinds of oxyalkylene groups may be added either in block form or at random; and r is an average molar number of the added oxyalkylene groups and is a number of 1 to 300.

14. A cement admixture according to claim 4, wherein a reaction system which is subjected to the copolymerization step in the process for obtaining the polycarboxylic acid merely includes a polyalkylene glycol di(meth)acrylate (E) of the general formula (4) below as an impurity in a ratio of 0 to 5% by weight of the polyalkylene glycol (meth)acrylate (C), wherein the general formula (4) is:

(4)

wherein: each of $R^4$ and $R^6$ is independently a hydrogen atom or a methyl group; $R^5O$ is one kind of oxyalkylene group or a mixture of two or more kinds thereof, wherein the two or more kinds of oxyalkylene groups may be added either in block form or at random; and r is an average molar number of the added oxyalkylene groups and is a number of 1 to 300.

15. A cement composition, comprising cement, a cement admixture as recited in claim 2, and water as essential components.

16. A cement composition, comprising cement, a cement admixture as recited in claim 3, and water as essential components.

17. A cement composition, comprising cement, a cement admixture as recited in claim 4, and water as essential components.

18. A cement composition, comprising cement, a cement admixture as recited in claim 5, and water as essential components.

19. A cement composition, comprising cement, a cement admixture as recited in claim 6, and water as essential components.

20. A process for producing a polycarboxylic acid according to claim 8, wherein the catalyst is added in a range of about 0.49 to about 4.0% by weight of the total quantity of the (meth)acrylic acid monomer (B) and the polyalkylene glycol (A).

21. A process for producing a polycarboxylic acid according to claim 8, wherein the esterification reaction is carried out in the presence of at least one solvent selected from the group consisting of aromatic solvents, alicyclic compounds, and aliphatic hydrocarbons.

22. A cement admixture according to claim 1, wherein n of general formula (1) is 10 to 250.

23. A process for producing a polycarboxylic acid according to claim 8, wherein n of general formula (1) is 10 to 250.

* * * * *